No. 766,500. PATENTED AUG. 2, 1904.
F. K. HATFIELD.
GARMENT FASTENER.
APPLICATION FILED DEC. 1, 1903.
NO MODEL.

Witnesses:
H. L. Robbins
E. Batchelder

Inventor:
F. K. Hatfield
by Wright Brown Quimby
Attys

No. 766,500. Patented August 2, 1904.

UNITED STATES PATENT OFFICE.

FRANK K. HATFIELD, OF BOSTON, MASSACHUSETTS.

GARMENT-FASTENER.

SPECIFICATION forming part of Letters Patent No. 766,500, dated August 2, 1904.

Application filed December 1, 1903. Serial No. 183,378. (No model.)

*To all whom it may concern:*

Be it known that I, FRANK K. HATFIELD, of Boston, in the county of Suffolk and State of Massachusetts, have invented certain new and useful Improvements in Garment-Fasteners; of which the following is a specification.

This invention relates to fasteners adapted particularly for securing together the sides of placket holes or openings in dress-skirts; and it has for its object to provide a simple, durable, and effective fastener the socket member of which shall be of sheet metal.

The invention consists in the improvements which I will now proceed to describe and claim.

Figure 1:
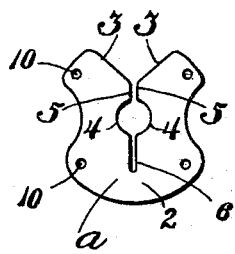
Figure 2:
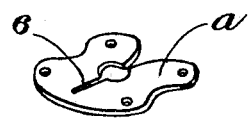
Figure 3:
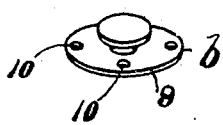
Figure 4:
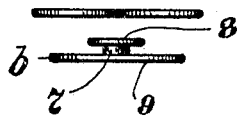
Figure 5:
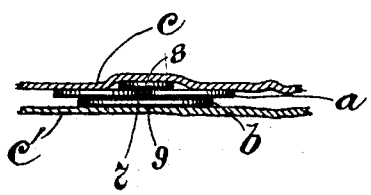

Of the accompanying drawings, forming a part of this specification, Figure 1 represents a plan view of the socket member of my improved fastener. Figs. 2 and 3 represent perspective views, respectively, of the socket member and the stud member. Fig. 4 represents the socket and stud members in elevation separated from each other. Fig. 5 represents a view similar to Fig. 4, showing the members connected and attached to portions of a garment.

The same reference characters indicate the same parts in all the figures.

The socket member of my improved fastener is composed of a substantially flat plate $a$, having an opening extending from one edge of the plate partly across the plate. The portions of the plate at opposite sides of the opening constitute jaws, which are resiliently united by the neck portion 2 of the plate at the inner end of the opening. The edges of the opening are formed to receive and engage a stud member, and, as here shown, each edge comprises a face 3, a recess 4, and a projection 5 between the said face and recess. The faces 3 3 are arranged to form a tapering throat, which decreases in width from the outer portion of the plate inwardly. The recesses 4 4 are formed to engage a cylindrical stud, and the projections 5 5 are formed to constitute a contracted mouth for the socket formed by the recesses 4 4. The said opening is preferably extended inwardly from the recesses 4 4, as shown at 6, Figs. 1 and 2.

The stud member $b$ of my improved device comprises a shank 7, formed to enter the space between the recesses 4 4 and to be partially embraced by the edges of said recesses, and two substantially flat sheet-metal heads 8 and 9, which are parallel with each other and are separated by a space of sufficient width to accommodate the thickness of the plate $a$. The two members are connected by forcing the shank 7 into the throat between the faces 3 3 and exerting sufficient pressure to spring the jaws apart until the shank passes between the projections 5 5 and enters the recesses 4 4. The heads 8 and 9 engage the sides of the member $a$, as indicated in Fig. 5, in such manner that neither of the members can tip independently of the other to an extent sufficient to cause or render liable a tipping movement of the member $a$ and the separation of the two members.

The member $a$ and the head 9 of the stud member $b$ are provided with orifices 10 or other suitable means for engaging attaching stitches or other fastening devices, whereby said members may be secured to the parts $c$ and $c'$ to be connected by the fastener.

It will be seen that the jaws into which the flat sheet-metal plate composing the member $a$ is converted by the opening formed in said plate, as shown and described, are arranged so that the force tending to separate them is exerted against their edges and is therefore opposed by the entire width of the jaws and of the neck 2. Hence the jaws, while adapted to yield to admit the stud member, close effectively on said member and are not liable to accidentally release it. As clearly shown in Figs. 4 and 5, the length of the shank 7 is such that the space between the heads 8 and 9 of the stud member is substantially the same as the thickness of the said heads and also substantially the same as the thickness of the plate $a$. Therefore the said plate $a$ must necessarily when the two members are in engagement closely occupy the space between the two heads of the stud member, and, moreover, this structure results in the fastener as a whole being quite thin, so that no objectionable bunch will be presented in the garment to which the members of the fastener are attached, and, as above stated, there is no possibility of there being any relative looseness of the stud and socket members when engaged with each other.

I claim—

A garment-fastener comprising a socket member consisting of a flat resilient plate $a$, having an opening extending from one edge thereof to form jaws, the opposing edges of the jaws being formed with inclined faces 3, 3, recesses 4, 4, and projections 5, 5, the said opening having a narrow extension 6, and a stud member consisting of two flat heads 8, 9, connected by a shank 7, the shank 7 being of a size to be retained in the opening in the socket member formed by the recesses 4, 4, and to spread the resilient jaws in passing the projections 5, 5, the width of the space between the heads 8, 9, of the stud member, and the thickness of the said heads and of the plate $a$ being all substantially the same, whereby the fastener as a whole will present no objectionable bunch in the garment and relative looseness of the two members is avoided.

In testimony whereof I have affixed my signature in presence of two witnesses.

FRANK K. HATFIELD.

Witnesses:
C. F. BROWN,
E. BATCHELDER.